United States Patent Office 2,961,512
Patented Nov. 22, 1960

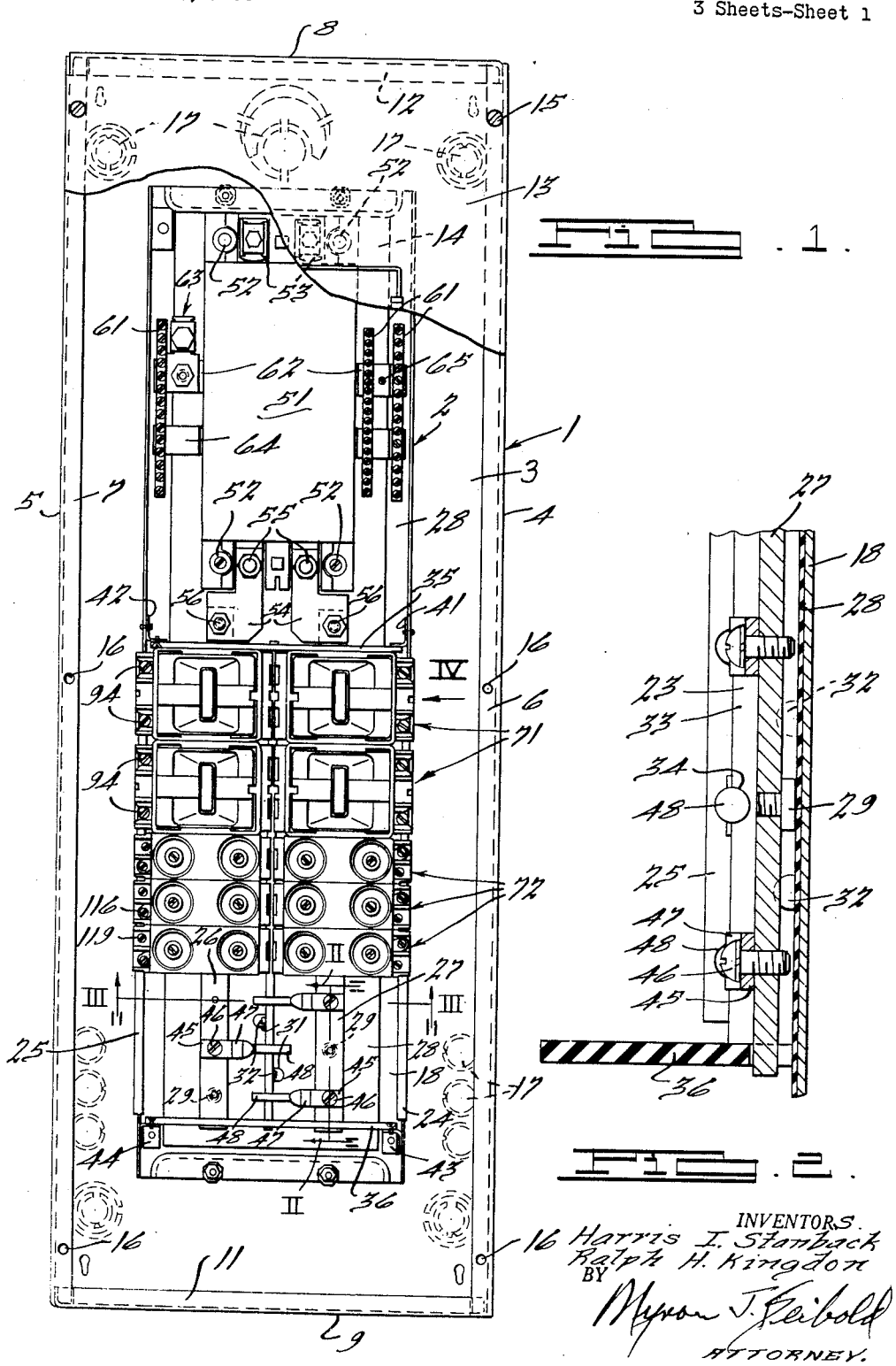

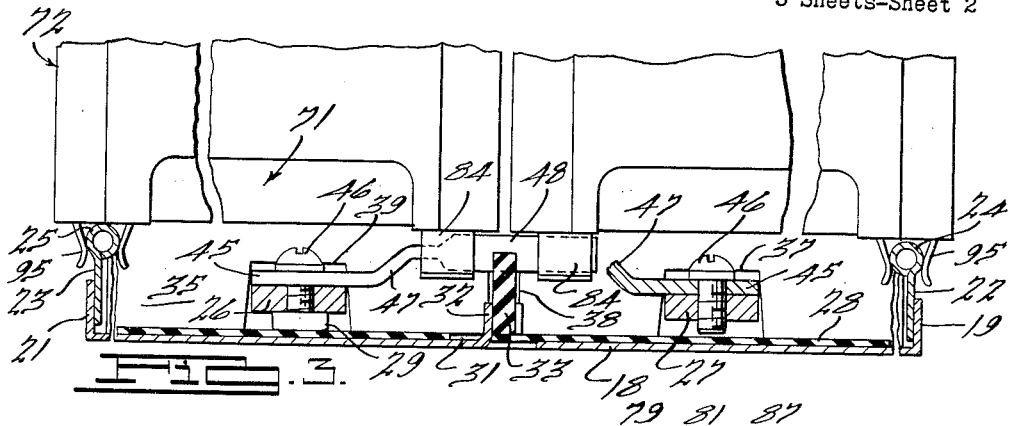

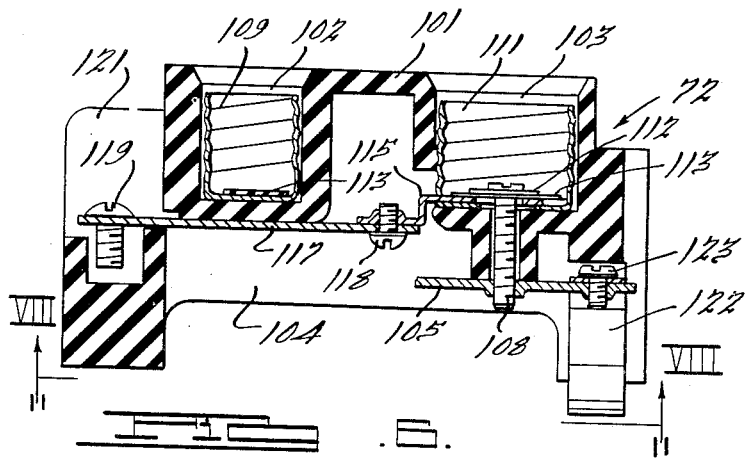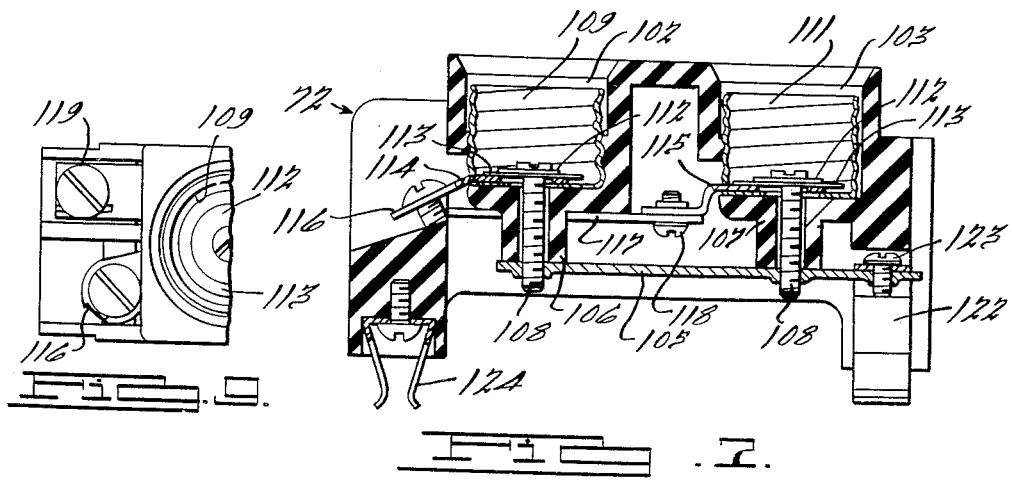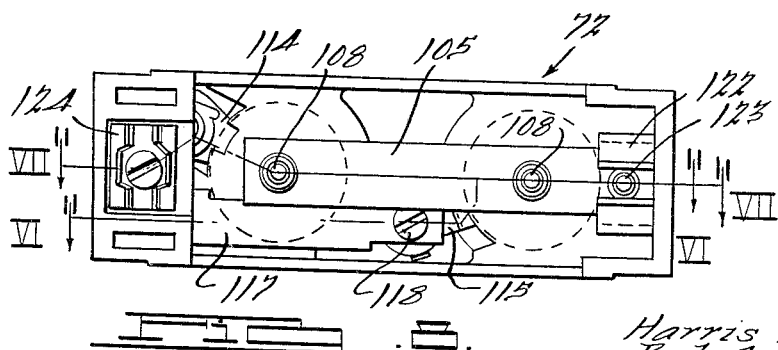

2,961,512

ELECTRICAL PANELBOARD

Harris I. Stanback and Ralph H. Kingdon, Birmingham, Mich., assignors to Square D Company, Detroit, Mich., a corporation of Michigan Filed Feb. 7, 1956, Ser. No. 563,982

3 Claims. (Cl. 200—114)

This invention relates to assemblies of electrical circuit controlling devices, such as panelboards, panels, panelettes, load centers and similar groupings hereinafter referred to as panelboards and to the devices incorporated therein.

One object of the present invention is the provision of an electrical panelboard constructed of a plurality of individual circuit controlling devices disposed in easily removable and readily accessible position within the panelboard.

Another object of the present invention is an electrical panelboard providing for ease of adaptation to any of many combinations of individual circuit controlling devices.

A further object of the present invention is an electrical panelboard comprising a plurality of individual circuit controlling elements, with the elements mounted within the panelboard in a plug-in fashion and with each individual circuit controlling element provided with a load connection area in a readily accessible location.

A further object of the present invention is an electrical circuit controlling device for use with the panelboard of the present invention and adapted for plug-in type mounting within the panelboard.

A further object of the present invention is an individual circuit controlling device provided with spring jaw attachment mechanisms and with one area to which all electrical load connections can be made.

A further object of the present invention is a unitized circuit controlling device enclosure adapted to accommodate at least a pair of individual circuit controlling elements and provided with means for connecting electrical load devices to the individual circuit controlling elements at the same end of the circuit controlling device enclosure.

A further object of the present invention in accordance with the preceding object is the provision of spring jaw electrical connecting means on the circuit controlling device enclosure of the present invention.

Further objects and features of the present invention will be readily apparent to those skilled in the art from the specification and appended drawings illustrating a certain preferred embodiment in which:

Figure 1 is a front elevational view of the panelboard of the present invention with portions of the cover broken away to show internal parts.

Figure 2 is a sectional view taken along the lines II—II of Figure 1.

Figure 3 is a sectional view taken along the lines III—III of Figure 1.

Figure 4 is a side elevational view of a circuit controlling element of the panelboard of the present invention and taken along the viewing line IV of Figure 1.

Figure 5 is a sectional view taken along the lines V—V of Figure 4.

Figure 6 is a sectional view taken along the lines VI—VI of Figure 8.

Figure 7 is a sectional view taken along the lines VII—VII of Figure 8.

Figure 8 is a bottom plan view of the circuit controlling device of Figures 6 and 7 and taken along the lines VIII—VIII of Figure 6.

Figure 9 is a partial elevational view of a circuit controlling element of the panelboard illustrating the terminal end of the element.

The electrical panelboard of the present invention constitutes a box-like enclosure 1 having an interior assembly 2 of electrical distribution devices supported therein. The box 1 comprises a channel shaped member 3 having sides 4 and 5 with upper turned-over lips 6 and 7 and a pair of end caps 8 and 9 with complementary turned-over lips 11 and 12. A cover 13 having a hinged door 14 is secured to the box 1 as by screws 15 extending through the cover 13 and threading into threaded holes 16 in the flanges 6 and 7 of the box side walls. Lanced knockouts are provided in the back wall 3 of the box 1 for the entry of conduits and conductors to and from the circuit controlling devices of the panelboard.

The interior assembly of the panelboard comprises a sheet metal pan 18 with turned-up edges 19 and 21 having, respectively, a pair of support channels 22 and 23 with rolled beads 24 and 25 secured thereto as by welding. The support members 22 and 23 extend generally throughout the lower half of the interior pan, while the upper half of the pan, as illustrated in Figure 1, remains unbeaded.

Supported within the lower half of the interior assembly are a pair of electrical distribution busses 26 and 27 insulated from the bottom of the pan 18 by a sheet of insulating material 28 and spaced above the insulating material by a plurality of spacing screws 29 of insulating material and having their threaded shanks threaded into tapped holes in the electrical distribution busses 26 and 27. The insulating sheet 28 has a plurality of holes 31 pierced therethrough in a zig-zag fashion along the lower half of the length thereof and the sheet metal pan 18 has a similar plurality of tabs 32 lanced and folded from the base thereof so as to extend up through the cutout holes 31 in the insulating sheet 28. Along the center of the lower half of the interior assembly and spaced between the tabs 32 is a sheet of insulating material 33 having arcuate cutout slots 34 evenly spaced along the length thereof. A pair of insulating barriers 35 and 36 are provided at the upper and lower ends, respectively, of the lower half of the interior trim assembly, each having cutout slots 37, 38 and 39 for cooperation with the distribution bus 27, the insulation barrier 33, and the distribution bus 26, respectively. A pair of brackets 41 and 42 are provided substantially at the center of the interior trim assembly secured to the sides 19 and 21, respectively, of the sheet metal pan 18 and the insulating plate 35 is secured thereto by suitable screws. At the lower end of the interior assembly a pair of brackets 43 and 44 are secured to the bottom of the sheet metal pan 18 and in a similar manner have the insulating plate 36 secured to their turned-up sides. In the manner of the foregoing assembly, the pair of distribution busses and the insulating barrier 33 are supported within the interior pan assembly.

A plurality of terminal transfer busses 45 are attached to the distribution busses 26 and 27 as by screws 46 in an alternate side for side manner throughout the generally lower half of the distribution panelboard and each is crooked as at 47 and pressed into a terminal portion of circular cross section at 48. The rod-like portions 48 extend into the arcuate cutouts 34 along the length of the insulating barrier 33 having substantially equal portions thereof on either side of the insulation barrier.

At the upper half of the interior assembly above the insulating barrier 35 a main disconnect device 51 which may be either a switch, a breaker or a pullout fusible device is supported by suitable screws 52 extending therethrough and threading into the bottom of the sheet metal pan 18. The main disconnect device 51 is provided with terminal lugs at 53 to which line conductors may be connected and a pair of transfer busses 54 are connected to the load side of the main disconnect device by attaching bolts 55. Attaching bolts 56 individually attach one of the transfer busses to each of the main distribution busses 26 and 27 at portions thereof extending through the insulation barrier 35.

Neutral bars are provided at 61 on both sides of the main disconnect device 51 and are interconnected by a copper bus 62 passing beneath the main disconnect device 51 and secured to the bottom thereof by suitable screws, not herein shown. A main neutral lug 63 is secured to the neutral bus 62 and a stabilizing bar of steel or the like is secured to the base of the main disconnect device 51, in the same manner as the neutral bus 62, and to the neutral bars 61 to provide for rigidity and stabilization alone. With the neutral bars and busses mounted in the foregoing manner, they will be electrically insulated from the interior assembly by means of the insulation sheet 14; however, when so required by electrical codes, the neutral assembly may be grounded to the panelboard box 1 through connection to the interior pan 18 as by optional screw 65 which will pass through the insulation sheet 14 and thread into the pan 18. The interior pan assembly 2 is secured to the bottom of the box 1 by a suitable plurality of nuts 60 threading onto studs welded to the bottom of the box and cooperating with cutout slots in the top and bottom of the sheet metal pan 18 in the conventional manner.

The fusible switching elements constituting the distribution devices of the panelboard of the present invention are of a plug-in type and adapted for the accommodation of cartridge type fuses as in units 71 or of Edison type fuses as in units 72. The unit 71 is generally shown in the United States patent of John G. Jackson and Ralph H. Kingdon No. 2,265,233 issued December 9, 1941 in the central portion of the interior assembly shown therein and constitutes a molded case 73 of insulating material having a central cavity at 74 and a molded removable fuse carrier 75 of insulating material provided with a handle at 76. The casing 73 is provided with a central barrier, not herein shown, and the removable portion 75 is adapted with resilient combination fuse holding jaws and knife blade-like contacts constituting a formed conductor 77 of generally U shape with a pair of legs 78 and 79 for the accommodation of a cartridge type fuse and with leg 79 having an extending portion 81 functioning as the switch blade. The cover portion 75 is adapted to accommodate two such cartridge fuses, one to either side of center thereof, and the insulating barrier of the molded casing 73 is adapted to electrically isolate the two fuse holding portions. The removable portion 75 is also adapted to be reversibly positioned within the molded casing 73 in a manner so as not to contact the electrically energized portions of the casing 73, and in this manner the removable portion 75 functions as a switching unit as well as a fusing unit.

An electrically conductive strip 82 is supported in the base of the molded casing 73 and is secured to a raised portion 83 in the interior casing as by a screw as shown in Figure 5 near the center thereof, and, at one end thereof, has a spring jawed electrical connecting clip 84 secured thereto by suitable screw 85. Also secured to the conducting strap 82 is a terminal jaw 86 extending to one side of the strap and terminating in a U-shaped contact jaw 87 adapted to accommodate the extending leg 81 of the fuse support 77. At the opposite end, the left side of the fuse holder as shown in Figure 5, a second conducting strap 88 is provided and supported on portions of the casing 73 by screw 89 and has secured thereto by a peened-over rivet 91 a terminal jaw 92 of the same construction as terminal jaw 87 but extending in an opposite direction from the conducting strap 88 as compared to the direction the terminal jaw 87 extends from the conducting strap 82. At the end of the removable portion 75 cooperating with the portion of the molded insulating casing 73 which supports the conducting strap 88, a second fuse holder 93 is provided and adapted with an extending leg portion similar to that portion previously designated 81 in the fuse holding jaw 77 for cooperation with the terminal jaw 92.

The opposite side of the pullout portion 75 of the fusible switching device 72, in the lower half of the device as viewed in Figure 4, is provided with a similar combination of fuse holding components to those just previously described in relation to the upper half of the pullout portion; however, the switching jaws and the fuse holding jaws of this lower half are reversed with respect to those portions of the upper half of the switching unit. That is, the fuse holding jaw comparable to fuse holding jaw 77 of the upper half of the switching unit will, instead of being on the near side of Figure 4, will be on the far side of Figure 4 and the fuse holding portion 93 will be on the near side rather than the far side of the switching device. The spring jawed portions in the molded insulation casing 73 for the lower half of the switching unit will be similarly reversed end for end in the casing so that with the portion 75 removed and turned 180 degrees, the extending portions, as 81, will not cooperate with conducting spring jaws, as 87 or 92, but will extend through suitable cutout portions of the molded casing not herein shown, and be insulated from electrically energized portions.

A terminal post is provided at 94 in a manner to be both mechanically supported on and electrically connected to the conducting strap 88 and the electrical path through the switching device will be from the spring jaw 84 through the conducting strap 82 to the terminal jaw 87, to the extension 81 of fuse holder clip 77, through a cartridge type fuse supported between fuse holder jaw 77 and fuse holder jaw 93, through an extended leg portion of the fuse holder jaw 93 to terminal jaw 92, to the electrically conducting strap 88 and to the terminal 94 to which a load device may be connected.

A second spring clip 95 of resilient material is suitably supported, in a manner not herein shown, at the end of the molded casing opposite to that end at which electrically conducting spring jaws 84 are connected to the rod-like portions 48 of terminal busses 45 attached to either of the main distribution busses 26 or 27.

The electrical circuit controlling devices 72 constitute plug-in units having a casing of molded insulating material 101 with a pair of upper cavities 102 and 103 and a hollow interior portion 104. An electrically conducting strap 105 is supported within the cavity 104 on shoulders 106 and 107 by screws 108, of conducting material, extending through the shoulders 106 and 107 so as to secure to the casing 101, within the cavities 102 and 103, a pair of Edison type threaded fuse sockets 109 and 111. The heads of screws 108 are provided with enlarged shoulders 112 adapted to engage an insulation washer 113 and to support, with the base of the sockets 109 and 111, transfer conducting straps 114 and 115, respectively. The transfer strap 114 extends through a cutout slot at the end of the casing 101 and terminates in a terminal 116, and transfer strap 115 is secured to a conducting strap 117 by screw 118 with conducting strap 117 extending along one side of the insulated casing 101 and extending through a cutout in the side thereof to terminate in a terminal 119. Terminals 116 and 119 are divided by an insulating barrier portion 121 of the casing 101.

Conducting strap 105 extends toward the end of the casing 101 opposite that at which the terminals are provided and has secured thereto, by screws 123, a spring jaw clip 122 extending beyond the casing 101 at the back thereof. A second spring jaw clip 124 is mounted to an extension of the molded insulating casing 101 by a suitable screw as shown in Figure 7 with the spring jaw legs thereof opening toward the back of the casing and turned 90 degrees with respect to the spring jaw clip 122.

The electrical circuit through the circuit controlling device 72 is from the spring jaw clip 122 through conducting strap 105 to screws 108, through a fuse, not herein shown, to both Edison type fuse sockets 109 and 111, to the conducting strap 114 and to the terminal 116 from socket 109 and to the conducting strap 115, conducting strap 117, to terminal 119 from socket 111. It should be noted that the electrical connection to the line side of the circuit controlling device 72 for both of the fuse sockets 109 and 111 is through the spring jaw clip 122 and that load devices connected to the circuit controlling device are made at the same end of the circuit controlling device.

The circuit controlling device 72 is mounted within the panelboard through the cooperation of spring jaw clips 24 with the rolled-over mounting beads, 24 or 25, of the side plates 22 or 23, respectively, secured to the sheet metal pan 18 of the interior assembly and, at the other end, through the engagement of the electrically conducting spring jaws 122 with the terminal transfer busses 45 at the tubular portion 48 thereof. It should be apparent that in the case of the circuit controlling devices 71 and 72 that the individual devices will be mounted side by side and end for end with respect to each other so that devices mounted to either of the rolled beads 24 or 25 in the same plane of the interior assembly will be mounted to the same transfer terminal bus 45 at the tubular portion 48 thereof.

In the panelboard of the present invention, any variety of combination of two socket unit Edison type fuse devices of the circuit controlling device shown at 72 or of the two cartridge type fuse devices of 71 may be supported in the panelboard within the physical limitations of the interior pan assembly. The panelboard of the present invention is intended for excitation at the terminal lugs 53 with, for example, a single phase, three-wire, 120—240 volt line so that between the main busses 26 and 27 the voltage will be 240 volts. Circuit controlling devices such as 71, which engage electrically the transfer busses 45 of opposite polarity, will therefore provide between their terminal lugs 94 a 240 volt circuit. The circuit controlling devices 72 are electrically connected to only one of the transfer busses 45 such that each of the devices may energize between their terminals 116 or 119 and ground a 120 volt electrical load. The panelboard, therefore, provides for electrical energization of a plurality of both 240 volt load circuits and 120 load circuits in any desirable combination within the physical dimension limitations of the panelboard itself.

Both the panelboard and the individual circuit controlling units comprising the panelboard are easily accessible for connection, removal or change as should be apparent from the foregoing description. Each of the circuit controlling devices 71 and 72 are provided with their load terminal attachment screws in the readily accessible portions so that load conduits or conductors may be connected to individual circuit controlling devices without threading the conductors through inaccessible portions of the panelboard. Each of the circuit controlling units may be readily removed from the panelboard for replacement or change as desired after the cover of the panelboard 13 has been removed, and each of the individual fusing devices within each of the individual circuit controlling devices may be readily removed from its socket when the hinged door 14 of the cover 13 is opened.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A fusible circuit controlling device comprising an insulating support in the form of a generally rectangular parallelepiped having its end faces materially farther apart than its side faces, a pair of fuse receptacles supported by said insulating support in spaced relation lengthwise of said support, each of said receptacles having a first conductive portion and a second conductive portion insulated from each other, a source terminal spaced lengthwise from said receptacles and adjacent one of said end faces of said insulating support for connecting said device to one side of a two-wire source of electrical power, a conductor means electrically connecting said source terminal and said first portion of each of said receptacles, a pair of load terminals insulated from each other, spaced lengthwise from said receptacles, and adjacent the other of said end faces, a conductor electrically connecting said second portion of one of said receptacles to one of said load terminals, and a conductor electrically connecting said second portion of the other of said receptacles to the other of said load terminals.

2. A fusible circuit controlling device in accordance with claim 1 characterized in that each of said first portions includes an elongated conducting member extending toward a bottom wall of said support, said conductor means connects the lower end portions of said conducting members to each other and to said source terminal, each of said second portions includes a cylindrical threaded conducting shell concentric with said conducting members, respectively, and said conductors connect said shells, respectively, to said respective load terminals.

3. A fusible circuit controlling device comprising an insulating support in the form of a generally rectangular parallelepiped having top and bottom faces and having its end faces materially farther apart than its side faces, a pair of fuse-receptacle openings in said top face disposed in spaced relation lengthwise of said support, fuse-receptacles in said openings, respectively, each of said receptacles having a first conductive portion and a second conductive portion insulated from each other, a source terminal means directed away from said bottom face for connecting said device to a source of electrical power, conductor means electrically connecting said source terminal means and said first portion of each of said receptacles, a pair of load terminals insulated from each other, directed toward said top face, spaced lengthwise from said receptacles, and each adjacent an end face, a conductor electrically connecting said second portion of one of said receptacles to one of said load terminals, and a conductor electrically connecting said second portion of the other of said receptacles to the other of said load terminals.

References Cited in the file of this patent

UNITED STATES PATENTS

| | | |
|---|---|---|
| 1,633,971 | Baxter | June 28, 1927 |
| 1,686,289 | Milano | Oct. 2, 1928 |
| 1,754,442 | Sachs | Apr. 5, 1930 |
| 1,936,004 | Allred | Nov. 21, 1933 |
| 1,965,410 | Frank | July 3, 1934 |
| 2,124,083 | Rypinski | July 19, 1938 |
| 2,128,647 | Johansson | Aug. 30, 1938 |
| 2,440,824 | Jackson | May 4, 1948 |
| 2,735,043 | Speck | Feb. 14, 1956 |
| 2,738,445 | Hammerly | Mar. 13, 1956 |
| 2,739,272 | Norden | Mar. 20, 1956 |

FOREIGN PATENTS

| | | |
|---|---|---|
| 155,770 | Great Britain | Mar. 19, 1954 |